US011061638B2

(12) United States Patent
Lam

(10) Patent No.: US 11,061,638 B2
(45) Date of Patent: Jul. 13, 2021

(54) DYNAMICALLY DETERMINING AN INTERFACE FOR PRESENTING INFORMATION TO A USER

(71) Applicant: The Toronto-Dominion Bank, Toronto (CA)

(72) Inventor: Brian Andrew Lam, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/573,513

(22) Filed: Sep. 17, 2019

(65) Prior Publication Data
US 2021/0081157 A1    Mar. 18, 2021

(51) Int. Cl.
 G06F 3/0484 (2013.01)
 G06F 3/14 (2006.01)
 G06F 3/16 (2006.01)
 H04L 29/08 (2006.01)
 G06F 16/904 (2019.01)

(52) U.S. Cl.
 CPC ........ G06F 3/1423 (2013.01); G06F 3/04842 (2013.01); G06F 3/167 (2013.01); G06F 16/904 (2019.01); H04L 67/14 (2013.01)

(58) Field of Classification Search
 CPC .. G06F 3/1423; G06F 3/04842; G06F 16/904; G06F 3/167; H04L 67/14
 See application file for complete search history.

(56) References Cited

U.S. PATENT DOCUMENTS 5,535,321 A * 7/1996 Massaro ................. G06F 9/453
 715/707
5,774,118 A * 6/1998 Hatakama ............... G06F 9/453
 715/707

(Continued)

FOREIGN PATENT DOCUMENTS

WO   WO2009073768   6/2009

OTHER PUBLICATIONS

Google, "Send information from Google Home to your phone," retrieved from URL: <https://support.google.com/googlehome/answer/7530880?co=GENIE.Platform%3DAndroid&hl=en> on Sep. 23, 2019. 4 pages.

(Continued)

*Primary Examiner* — Yongjia Pan
(74) *Attorney, Agent, or Firm* — Fish & Richardson P.C.

(57) ABSTRACT

The present disclosure involves systems, software, and computer implemented methods for presenting information and/or services to a user. One example method includes establishing a user session between a computing device operated by an entity and a first user device operated by a customer of the entity. The first user device provides a first interface through which the customer participates in the user session. The method also includes determining, based at least on a complexity of first information to be provided to the customer, to change the first interface to a new interface. Further, the method includes selecting, based on the complexity of the first information, a new interface, where the new interface is provided by at least a second user device. Furthermore, the method includes implementing the new interface to facilitate for the customer to participate in the user session.

17 Claims, 4 Drawing Sheets

(56) References Cited

U.S. PATENT DOCUMENTS

| | | | |
|---|---|---|---|
| 6,430,609 B1* | 8/2002 | Dewhurst | G06F 30/23 |
| | | | 709/220 |
| 6,694,308 B2* | 2/2004 | Tremblay | G06F 11/302 |
| 7,379,778 B2 | 5/2008 | Hayes et al. | |
| 7,554,544 B2* | 6/2009 | MacLaurin | G06T 11/60 |
| | | | 345/440 |
| 7,912,767 B1* | 3/2011 | Cheatham | G06Q 40/123 |
| | | | 705/31 |
| 8,195,467 B2* | 6/2012 | Mozer | G10L 15/30 |
| | | | 704/275 |
| 8,619,111 B2* | 12/2013 | Roach, Jr. | H04N 7/15 |
| | | | 348/14.01 |
| 8,701,003 B2* | 4/2014 | Kondziela | G06F 3/011 |
| | | | 715/707 |
| 8,863,196 B2 | 10/2014 | Patil et al. | |
| 8,959,488 B2* | 2/2015 | Lauff | G06F 8/38 |
| | | | 717/104 |
| 9,116,989 B1 | 8/2015 | Ehlen et al. | |
| 9,160,844 B2 | 10/2015 | Bouzid et al. | |
| 9,230,560 B2 | 1/2016 | Ehsani et al. | |
| 9,641,954 B1 | 5/2017 | Typrin et al. | |
| 9,718,185 B2 | 8/2017 | Gupta et al. | |
| 9,843,907 B2 | 12/2017 | Engstrom et al. | |
| 10,713,008 B2 | 7/2020 | Sarir et al. | |
| 2006/0259272 A1* | 11/2006 | Sattler | G06F 16/9535 |
| | | | 702/181 |
| 2007/0043687 A1 | 2/2007 | Bodart et al. | |
| 2007/0050719 A1* | 3/2007 | Lui | G06F 9/453 |
| | | | 715/762 |
| 2008/0148367 A1 | 6/2008 | Hilerio et al. | |
| 2008/0267092 A1 | 10/2008 | Willenborg et al. | |
| 2009/0138609 A1 | 5/2009 | Anderson et al. | |
| 2010/0115053 A1 | 5/2010 | Ryu et al. | |
| 2010/0169844 A1* | 7/2010 | Hoff | G06F 9/44505 |
| | | | 715/866 |
| 2010/0305991 A1* | 12/2010 | Diao | G06Q 10/1097 |
| | | | 705/7.21 |
| 2012/0218287 A1 | 8/2012 | McWilliams | |
| 2014/0343946 A1 | 11/2014 | Torok et al. | |
| 2015/0186156 A1 | 7/2015 | Brown et al. | |
| 2015/0347900 A1* | 12/2015 | Bell | G06N 5/02 |
| | | | 706/11 |
| 2016/0065573 A1 | 3/2016 | Bulusu et al. | |
| 2016/0121479 A1 | 5/2016 | Lin et al. | |
| 2017/0116990 A1 | 4/2017 | Faaborg et al. | |
| 2017/0148436 A1 | 5/2017 | Sugiura et al. | |
| 2017/0178626 A1 | 6/2017 | Gruber et al. | |
| 2017/0285915 A1 | 10/2017 | Napolitano et al. | |
| 2017/0351537 A1* | 12/2017 | AbiEzzi | G06F 9/452 |
| 2018/0143802 A1 | 5/2018 | Jang | |
| 2018/0336009 A1 | 11/2018 | Yoganandan et al. | |
| 2020/0057603 A1* | 2/2020 | Sarir | G06F 3/04817 |
| 2020/0301662 A1 | 9/2020 | Sarir et al. | |

OTHER PUBLICATIONS

Martin, "How to Listen to Audiobooks on Google Home." Jan. 2018 [retrieved on Feb. 24, 2021], retrieved from: URL <https://www.cnet.com/how-to/how-to-listen-to-audiobooks-on-google-home/>, 3 pages.

Santos, "VLC Media Player for IPA available for download" Sep. 2010 [retrieved on Feb. 24, 2021], retrieved from: URL <https://en.softonic.com/articles/vlc-media-player-for-ipad-available-for-download/>, 2 pages.

* cited by examiner

US 11,061,638 B2

DYNAMICALLY DETERMINING AN INTERFACE FOR PRESENTING INFORMATION TO A USER

TECHNICAL FIELD

The present disclosure relates to computer-implemented methods, software, and systems for dynamically determining an interface for presenting information to a user.

BACKGROUND

Financial institutions, such as banks or credit card providers, provide customers (also referred to herein as "users") with digital access to information (e.g., account information). Financial institutions also provide customers with digital financial services, such as online banking, general financial advice (e.g., articles, tutorials, and lectures), and/or personalized financial advice (e.g., prepared by a financial advisor). To provide access to these services, financial institutions develop different interfaces, such as audio and/or visual interfaces, that customers can use to access the services. For example, a financial institution may develop a mobile application through which a customer can access financial information and/or services. The different interfaces that are developed by a financial institution can be accessed using digital devices, such as computers, mobile devices, and audio-based devices.

SUMMARY

The present disclosure involves systems, software, and computer implemented methods for presenting information and/or services to a user.

In one example system, the system may comprise a memory and at least one hardware processor interoperably coupled with the memory, where the at least one processor is configured to perform operations. The operations can include establishing, by a computing device operated by an entity, a user session with a first user device operated by a customer of the entity. The first user device provides a first interface through which the customer participates in the user session and the computing device is configured to provide the first user device with information during the user session. The operations further include determining, based at least on a complexity of first information to be provided to the customer, to change the first interface to a new interface. Furthermore, the operations include selecting, based on the complexity of the first information, the new interface, wherein the new interface is provided by at least a second user device. Yet further, the operations include implementing the new interface to facilitate for the customer to participate in the user session.

In some instances, the operations may further include providing the first information to the user via the new interface.

In some instances, the new interface is further provided by the first user device.

In some of those instances, the first interface includes an audio interface provided by the first user device, wherein the new interface includes a hybrid audio-visual interface, and wherein a visual portion of the hybrid audio-visual interface is provided by the second user device.

In some instances, establishing, by the computing device, the user session with the first user device includes receiving, from the first user device, a request to establish the user session with the first user device.

In some instances, establishing, by the computing device, the user session with the first user device includes determining, by the computing device and based on at least on one of event triggers or contextual data, to establish the user session with the first user device.

In some instances, determining, based at least on a complexity of first information to be provided to the customer, to change the first interface to a new interface includes: (i) analyzing the first information to determine a complexity level for the first information, and (ii) determining that the complexity level of the first information is greater than a threshold complexity level associated with the first interface.

In some of those instances, selecting, based on the complexity of the first information, the new interface, includes: (i) determining, based on contextual data, at least one available interface for the user, and (ii) selecting, from the at least one interface, a subset of interfaces that are associated with a respective threshold complexity level greater than the complexity level of the first information.

In some of those instances, the operations further include: (i) providing, by the computing device, a list of the subset of interfaces to the user device, and (ii) receiving, from the first user device, a selection of an interface of the subset, wherein the selected interface is the new interface.

Similar or analogous computer-readable mediums storing non-transitory computer-readable instructions executable by a computer and configured to perform similar operations to the method may be used. Additionally, a computerized method performed by at least one processor can perform these or similar operations.

While generally described as computer-implemented software embodied on tangible and/or non-transitory media that processes and transforms the respective data, some or all of the aspects may be computer-implemented methods or further included in respective systems, non-transitory, computer-readable medium, or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
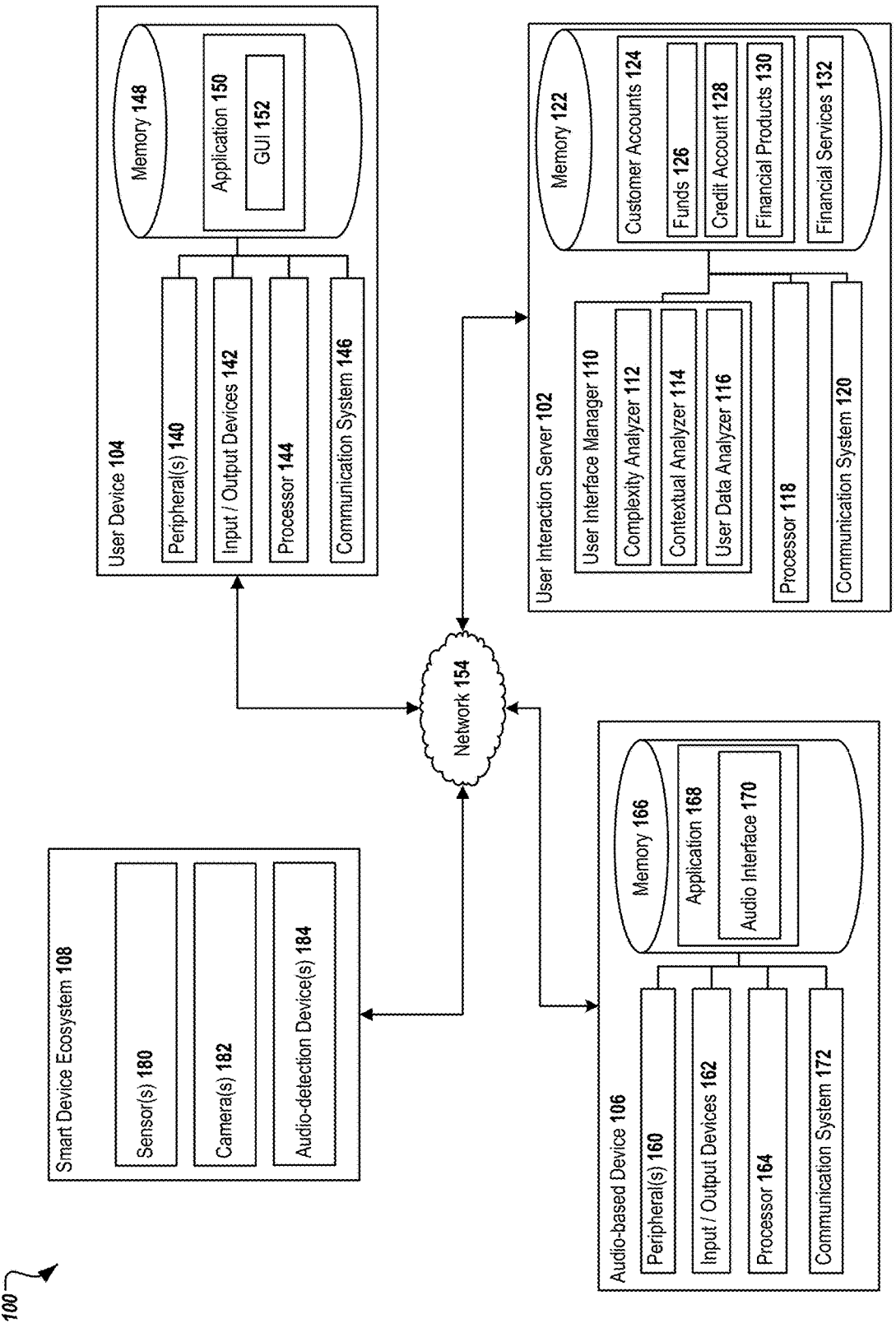
FIG. 1 is a block diagram illustrating an example system for presenting information and/or services to a user, according to some implementations of the present disclosure.

The present disclosure describes various tools and techniques for presenting information to a user. Using the tools described herein, an interface for presenting information to the user can be selected based on an analysis of: (i) the complexity of the information provided to the user, (ii) contextual factors, and (iii) user preferences, among others.

A financial institution may provide its customers with access to information and/or financial services. Specifically, the financial institution may provide interfaces that allow customers to interact with a system operated by the financial institution, perhaps to receive financial information and/or services. The interfaces may include audio and/or visual interfaces. Additionally, the interfaces can be accessed using digital devices, such as smartphones, personal computers, audio-based devices, etc. In some implementations, a software application associated with the financial institution may be executed by a digital device in order to provide access to an interface. For example, a customer may install a mobile software application on a smartphone in order to access an interface via the smartphone. Once a customer accesses an interface, the customer can use the interface to interact with a financial institution system, perhaps to receive financial information and/or services.

In some scenarios, a customer may use a first interface to initiate a user session with the system. The first interface may be suitable for providing and/or receiving certain types of information. However, during the user session, the system may determine, perhaps autonomously or in response to a customer request, to provide the customer with information that is not suitable for the first interface. In this scenario, the system either can nevertheless provide the information to the customer through the first interface or can instruct the customer to access the information using a different interface. Neither of these options are attractive for the customer. As for the first option, given that the information is not suitable for presentation via the first interface, the customer may not benefit from receiving the information through the first interface. As for the second option, the customer would need to end the current user session and initiate an entirely new session with the system using a different interface, thereby wasting time and effort.

As an example, consider that has initiated a user session through an audio interface implemented by an audio-based device (e.g., a smart speaker, via an audio-based interaction on a mobile phone, etc.). Generally, audio interfaces are suitable for simple commands or questions, cases where the customer knows the desired request (thereby negating the need for any navigation or search), and low information use cases. However, audio interfaces are not suitable for evaluating long lists of items, comparing multiple options, products, or features, reviewing data (e.g., graphs or diagrams), reviewing information that the customer has not seen before and where visualization is helpful (e.g., shopping information, receipts, etc.), and/or high information use cases. During the user session, the customer may request information that may be not effective to provide through the audio interface. In this scenario, the system may nevertheless provide the information to the user or may instruct the user to access the information through a different interface. As explained above, neither of these options is attractive for the user and detracts from the user experience.

Disclosed herein is a solution that can proactively determine during an ongoing user session to change an interface that is being used to present information and/or services to the user. Specifically, the solution proactively detects a scenario where the current interface is no longer suitable for presenting information and/or services to the user and determines to change the interface to a new interface that is suitable for presenting the information and/or services to the user. The solution can then automatically select and initiate a new interface for the user session. Specifically, the solution can utilize the different types of devices that are available to the user (e.g., smart speakers, mobile phones, tablets, desktop computers, internet-of-things devices, etc.) in order to select an interface that is suitable for presenting the information and/or services to the user. Furthermore, the solution can seamlessly transition the ongoing user session from the original interface to the new interface.

One benefit provided by this solution is the ability to optimize the presentation of information across multiple multimedia interfaces (for example, audio and/or visual interfaces). In an embodiment, a user session is initiated, perhaps by a user (e.g., using a standard user agent browser, software application, etc.) or intelligently by an artificial intelligence (AI) system (e.g., a proactive virtual agent or assistant). At the onset of the user session, the solution may present information and/or services to the user via a first interface. For example, the first interface may be a single interface, such as an audio interface. However, it may be difficult to present certain types of information via the audio interface. For example, it is difficult to present information that includes a large amount of information (e.g., greater than threshold number of words, figures, pages, and/or utilized screen space), lists of items, multiple options/products/features, visual data (e.g., graphics, diagrams, etc.), and data that the user has not previously seen. As such, the solution may proactively monitor the user session in order to detect a scenario where this type of information is to be presented to the user. In response to detecting this scenario, the solution may select a new interface that is capable of presenting the desired information and/or services to the user. In an implementation, the system may determine an optimal new interface. In determining the optimal interface, the system considers various factors, such as available devices, complexity of the visuals/information in the second presentation, user preferences, and/or contextual factors (e.g., user location, presence of others in the location, type information (e.g., public or private information), time). The solution may generate a ranked listing of possible new interfaces. The solution may provide the user with that listing for selection, or may just provide the user with the top choice for approval. Once the new interface is selected or approved, the system may implement the new interface to present the desired information to the user.

Within examples, the solution can be used to develop new systems and/or augment current systems. In a first example, the solution can be used to augment existing voice assistant skills and/or actions. For instance, the solution can be used to proactively select a new interface in response to queries to an audio-based device that involve: inquiring about the nearest branch location, stock prices and FX rates, product comparisons (e.g., credit cards, loans, investment plans, insurance, savings accounts, etc.), and stocks (e.g., stock research/history, portfolio review, and net worth calculation). The audio-based device may have difficulty adequately addressing these requests. The solution can also be used to select a new interface in response to a user request (e.g., a verbal command, such as "show me," when interacting with an audio interface. As such, the solution may provide the user with new interface options. The solution may then transition the user session to the new interface (e.g., a visual interface) in order to address the user's information requests.

In a second example, the solution can be used to augment existing mobile applications. For instance, during a user session where a user is using a mobile application, the solution may proactively query the user if the user would like to transition to a different interface that may be more suitable for presenting the information that the user is accessing. The information that the user may be viewing include expense or spending breakdown, transaction searches, and/or disputes.

In a third example, the solution can be used to facilitate a proactive conversation from a virtual assistant. Specifically, in this example, the solution can proactively initiate a user session with the user in order to present the user with financial information and/or services. In an instance, the solution can initiate the user session in response to an event trigger, such as a paycheck deposit. The proactive services offered by the virtual assistant can include recommended paycheck distribution, device-to-device (D2D) banking and budget alerts, personal financial review for a given period, projected savings, relevant product offers, portfolio watch and review (e.g., market exposure, geographic/sector/type, overlap, etc.), and reminders for bills, renewals, payments, etc.

In a fourth example, the solution can be used to implement an assisted-channel experience (e.g., screen share). In this example, when a user is interacting with an entity over a first interface (e.g., phone or chat), the solution may determine to implement a second interface that supplements the first interface. The second interface may allow the entity to provide the user with information that cannot be provided via the interface. To illustrate, a user may be on the phone with a representative (e.g., a customer service representative) of an entity (e.g., a bank). The representative may want to provide visual information to the user, perhaps to visually illustrate different options available to the user. The disclosed solution may determine (e.g., autonomously or in response to a user request) to implement the second interface.

In a fifth example, the solution can be used to improve the delivery of financial literacy programs. For instance, the solution can proactively select an optimal display for learning modules and definitions, where the learning modules can be animated, gamified, and interactive. Other example benefits and uses are clear to one of ordinary skill in the art.

In a sixth example, the solution can also be used to enhance online platforms (e.g., an online banking platform) with a voice/conversational interface. For instance, when accessing an online platform, a user may seek to interact with an audio interface, perhaps to ask a question, receive an explanation, and/or receive advice.

In a seventh example, the solution can be used to improve visualizations for the user. For instance, the initial user session may be started on a smaller display screen. Based on the size of a display screen, the relative complexity of a particular illustration or other visualization may be too detailed to be properly presented on that initial display screen, and a larger available screen or user interface may be identified. In some instances, this may include a move from a multimedia or audio/visual presentation on a smartphone screen to an audio/visual presentation on a larger television or projector.

Particular implementations of the subject matter described in this disclosure can be implemented to realize one or more of the following advantages. First, the disclosed solution facilitates optimizing the presentation of information across multiple multimedia interfaces (for example, audible and/or visual interfaces), thereby enhancing user experience and/or delivery of information. Second, the disclosed solution enhances user privacy by automatically adjusting the presentation of information based on privacy factors (e.g., privacy level of information presented to the user, a location of the user, individuals located near the user, etc.). Third, the disclosed solution enhances the accessibility of information provided by an entity. For example, the entity may be providing information via a first interface to a user. However, the user may not be able to adequately receive information via the first interface, perhaps due to medical reasons. In response to determining that the user is not receiving information adequately, the disclosed solution may automatically select a suitable interface through which to provide information to the user.

Turning to the illustrated example implementation, FIG. 1 is a block diagram illustrating an example system 100 for dynamically determining a user interface that can present information and/or services to a user, perhaps financial information and/or services to a customer of a financial institution. Note that although FIG. 1 is described in the context of a financial information and/or services provided to a customer of a financial institution, the system 100 can be applied in other non-financial contexts. As shown in FIG. 1, the system 100 includes a user interaction server 102, a user device 104, an audio-based device 106, and a smart device ecosystem 108. As described herein, the user interaction server 102 may be a cloud-based server that is operated by the financial institution. On the other hand, the user device 104, the audio-based device 106, and the smart device ecosystem 108 may be located in proximity of the user and may be owned and/or operated by the user. For example, the user device 104, the audio-based device 106, and the smart device ecosystem 108 may include mobile devices that are on or near the person of the user (e.g., a smartphone, head-mountable device, wearable device, etc.) and/or fixed devices that are disposed in a local environment of the user (e.g., a home or workplace). As described herein, the user may receive financial information and/or services from the financial institution via one or more interfaces provided by the user devices. For the sake of simplicity, FIG. 1 illustrates only the user device 104 and the audio-based device 106 as user devices of the system 100. However, the system 100 may include additional devices, perhaps of different types or categories, to those shown in FIG. 1. In general, the system 100 allows the illustrated components to share and communicate information via network 154. Although components are shown individually, in some implementations, functionality of two or more components, systems, or servers may be provided by a single component, system, or server.

As used in the present disclosure, the term "computer" is intended to encompass any suitable processing device. For example, the user interaction server 102, the user device 104, and the audio-based device 106 may be any computer or processing device such as, for example, a blade server, general-purpose personal computer (PC), Mac®, workstation, UNIX-based workstation, or any other suitable device. Moreover, although FIG. 1 illustrates a single user interaction server 102, the user interaction server 102 can be implemented using a single system or more than those illustrated, as well as computers other than servers, including a server pool. In some instances, the user interaction server 102 may be implemented as a cloud-based component or system. In other instances, the user interaction server 102 may include non-cloud systems. In some instances, non-cloud-based systems, such as on-premise systems, client-server applications, and applications running on one or more client devices, as well as combinations thereof, may use or adapt the processes described herein. In other words, the present disclosure contemplates computers other than general-purpose computers, as well as computers without conventional operating systems.

The user device 104 and the audio-based device 106 may be any system that can request data and/or interact with the user interaction server 102. The user device 104 and the audio-based device 106 in some instances may be desktop systems, client terminals, point-of-sale (POS) systems, or any other suitable device or system, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others. The user device 104 and the audio-based device 106 may include one or more specific applications executing on the devices. Additionally and/or alternatively, the user device 104 and the audio-based device 106 may include one or more Web browsers or web applications that can interact with particular applications executing remotely from the devices.

Network 154 facilitates wireless or wireline communications between the components of the system 100 (e.g., between the user interaction server 102, the user device 104, the audio-based device 106, and the smart device ecosystem 108). Additionally, the network 154 facilitates wireless or wireline communications with any other local or remote computers, such as additional mobile devices, clients, servers, or other devices communicably coupled to network 154, including those not illustrated in FIG. 1. In the illustrated environment, the network 154 is depicted as a single network, but may be comprised of more than one network without departing from the scope of this disclosure, so long as at least a portion of the network 154 may facilitate communications between senders and recipients. In some instances, one or more of the illustrated components (e.g., the user interaction server 102) may be included within or deployed to network 154 or a portion thereof as one or more cloud-based services or operations. The network 154 may be all or a portion of an enterprise or secured network, while in another instance, at least a portion of the network 154 may represent a connection to the Internet. In some instances, a portion of the network 154 may be a virtual private network (VPN). Further, all or a portion of the network 154 can comprise either a wireline or wireless link. Example wireless links may include 802.11a/b/g/n/ac, 802.20, WiMax, LTE, and/or any other appropriate wireless link. In other words, the network 154 encompasses any internal or external network, networks, sub-network, or combination thereof operable to facilitate communications between various computing components inside and outside the illustrated system 100. The network 154 may communicate, for example, Internet Protocol (IP) packets, Frame Relay frames, Asynchronous Transfer Mode (ATM) cells, voice, video, data, and other suitable information between network addresses. The network 154 may also include one or more local area networks (LANs), radio access networks (RANs), metropolitan area networks (MANs), wide area networks (WANs), all or a portion of the Internet, and/or any other communication system or systems at one or more locations.

The user interaction server 102 may be associated with the one or more cloud-based applications or platforms and may be associated with or a part of a cloud platform. As illustrated, the user interaction server 102 includes or is associated with communication system 120, processor 118, user interface manager 110, and memory 122. The communication system 120 is used by the user interaction server 102 for communicating with other systems in a distributed environment—including within system 100—connected to the network 154, e.g., the user device 104, the audio-based device 106, and the smart device ecosystem 108. Generally, the communication system 120 comprises logic encoded in software and/or hardware in a suitable combination and operable to communicate with the network 154 and other components. More specifically, the communication system 120 may comprise software supporting one or more communication protocols associated with communications such that the network 154 and/or interface's hardware is operable to communicate physical signals within and outside of the illustrated system 100. Still further, the communication system 120 may allow the user interaction server 102 to communicate with the user device 104, the audio-based device 106, and the smart device ecosystem 108. Specifically, a user session may be established between the user devices and the user interaction server 102. The communication system 120 may communicate with the user devices to obtain and/or provide information regarding the user session. From the received information, the user interaction server 102 can analyze information associated with the user session.

The user interaction server 102 also includes one or more processors 118. Although illustrated as a single processor 118 in FIG. 1, multiple processors may be used according to particular needs, desires, or particular implementations of the system 100. Each processor 118 may be a central processing unit (CPU), an application specific integrated circuit (ASIC), a field-programmable gate array (FPGA), or another suitable component. Generally, the processor 118 executes instructions and manipulates data to perform the operations of the user interaction server 102. Specifically, the processor 118 executes the algorithms and operations described in the illustrated figures, as well as the various software modules and functionality, including the functionality for sending communications to and receiving transmissions from the user device 104, the audio-based device 106, and the smart device ecosystem 108, as well as to other devices and systems. Each processor 118 may have a single or multiple cores, with each core available to host and execute an individual processing thread. Further, the number of, types of, and particular processors 118 used to execute the operations described herein may be dynamically determined based on a number of requests, interactions, and operations associated with the user interaction server 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Peri®, any suitable version of 4GL, as well as others.

The user interaction server 102 can include, among other components, several applications, entities, programs, agents, or other software or similar components capable of performing the operations described herein.

In an implementation, the user interaction server 102 may be responsible for managing user sessions between user devices and the user interaction server 102. A user session may involve a user using a digital device to access an interface in order to receive financial information and/or services from the financial institution. The interface may be any audio and/or visual interface that can be accessed using one or more digital devices. Example interfaces include: (i) an audio interface that can be accessed using an audio-based device (e.g., the audio-based device 106), (ii) a visual interface that can be accessed using a computing device (e.g., user device 104), and (iii) a hybrid interface that includes at least one audio interface and at least one visual interface used in combination and/or in a synchronized manner.

In an implementation, the user session can be initiated by the user, perhaps by using a device to access an interface. In an example, the user may interact with a mobile software application installed on a smartphone to access a graphical user interface (GUI) of the mobile software application. In another example, the user may interact with an audio software application installed on an audio-based device in order to access an audio interface. For instance, the user may interact with the audio interface using audio commands (e.g., predetermined commands that are associated with the voice-based device and/or the audio interface) in order to initiate the user session.

In another implementation, the user session may be initiated autonomously by the user interaction server 102. In an embodiment, the user interaction server 102 may use event triggers and/or contextual data to determine when, and if, to initiate a user session. The event triggers can include the occurrence of any financial event, such as paycheck deposits, product offers, budget alerts, bill reminders, and a threshold of time being exceeded since the last user financial action. In some implementations, triggers may be categorized according to urgency (e.g., urgent and not urgent). For example, urgent triggers may be triggers that are associated with a financial event that involves large transactions or that involves penalties/fees. The contextual data includes temporal data (e.g., day of the week, date, and time), user device data (e.g., smartphone data and wearable device data), local environment data (e.g., data provided by the smart device ecosystem 108), and calendar information (e.g., appointments, meetings, work hours, working from home days, and vacation dates).

In an implementation, the user interaction server 102 can apply a two-step approach to determine whether to initiate the user session. In the first step of the approach, the user interaction server 102 determines whether a triggering event has occurred. In the second step, the user interaction server 102 considers contextual data to determine whether to initiate a user session to inform the user of the triggering event. More specifically, in the first step, the user interaction server 102 can determine whether a triggering event has occurred. Specifically, the user interaction server 102 may monitor the user's account to detect the occurrence of at least one trigger. In response to detecting the occurrence of at least one trigger, the user interaction server 102 may evaluate the at least one trigger. For example, the user interaction server 102 may consider the respective urgency of the at least one trigger. Then, the user interaction server 102 may proceed to the second step of the approach.

In the second step, the user interaction server 102 may analyze the contextual data to determine whether to initiate the user session to address the triggering event. In an implementation, the user interaction server 102 may analyze the contextual data to determine a status of the user and/or of the user's environment. The status of the user may indicate whether the user is preoccupied with an activity (e.g., eating, exercising, sleeping, on a phone call, etc.), user's level of privacy (e.g., determined based on WiFi signals, sensor data, etc.), and/or the user's mood (e.g., good mood, irritable mood, etc.). The user status may be determined based on data from the user's devices (e.g., smartphone and wearable devices), data from the user's calendar, and/or data from the smart device ecosystem 108. The status of the user's environment may indicate a number of individuals located in the local environment, a proximity of the individuals to the user, a relationship of the individuals with the user, and a distraction level (e.g., based on a noise level) in the local environment. Based on the user status and/or the status of the user's environment, the user interaction server 102 may determine whether to initiate the user session to address the triggering event with the user. For example, the user interaction server 102 may deduce from the contextual data an appropriate time for initiating the user session. For instance, if the user is in a good mood and does not have any scheduled appointments on a weekend, then the user interaction server 102 may deduce that the time is appropriate for a user session.

In some implementations, the user interaction server 102 may employ a machine-learning model to determine when, and if, the user session should be initiated. In an example, if the user is not home and does not have a calendar appointment, then the user interaction server 102 may contact the user, e.g., via an automated phone call or text message, to schedule a user session. In another example, if the user interaction server 102 detects a non-urgent trigger, the machine-learning model may determine to wait until the user arrives at home and then initiates a proactive user session. The user interaction server 102 may also solicit user feedback and use the feedback in order to refine the machine-learning model. Based on user feedback that is received over time, the model may be refined to determine the contact methods based on the type/importance of the message and the contextual triggers described above.

Generally, machine-learning can encompass a wide variety of different techniques that are used to train a machine to perform specific tasks without being specifically programmed to perform those tasks. The machine can be trained using different machine-learning techniques, including, for example, supervised learning, unsupervised learning, and reinforcement learning. In supervised learning, inputs and corresponding outputs of interest are provided to the machine. The machine adjusts its functions in order to provide the desired output when the inputs are provided. Supervised learning is generally used to teach a computer to solve problems in which are outcome determinative. In contrast, in unsupervised learning inputs are provided without providing a corresponding desired output. Unsupervised learning is generally used in classification problems such as, customer segmentation. Reinforcement learning describes an algorithm in which a machine makes decisions using trial and error. Feedback informs the machine when a good choice or bad choice is made. The machine then adjusts its algorithms accordingly.

In an embodiment, the trained learning model may be embodied as an artificial neural network. Artificial neural networks (ANNs) or connectionist systems are computing systems inspired by the biological neural networks that constitute animal brains. An ANN is based on a collection of connected units or nodes, called artificial. Each connection, like the synapses in a biological brain, can transmit a signal from one artificial neuron to another. An artificial neuron that receives a signal can process it and then signal additional artificial neurons connected to it. In common ANN implementations, the signal at a connection between artificial neurons is a real number, and the output of each artificial neuron is computed by some non-linear function of the sum of its inputs. The connections between artificial neurons are called 'edges.' Artificial neurons and edges may have a weight that adjusts as learning proceeds (for example, each input to an artificial neuron may be separately weighted).

The weight increases or decreases the strength of the signal at a connection. Artificial neurons may have a threshold such that the signal is only sent if the aggregate signal crosses that threshold. The transfer functions along the edges usually have a sigmoid shape, but they may also take the form of other non-linear functions, piecewise linear functions, or step functions. Typically, artificial neurons are aggregated into layers. Different layers may perform different kinds of transformations on their inputs. Signals travel from the first layer (the input layer), to the last layer (the output layer), possibly after traversing the layers multiple times.

In some implementations, the user interaction server 102 may request approval from the user to initiate the session. The user interaction server 102 may communicate with the user through any of the user devices that are connected to the network 154. Examples of the communication methods include a text message, a phone call, a push notification on a smartphone, and an audio message. The user interaction server 102 may then await confirmation from the user before initiating the session. If the user responds by declining the user session, the user interaction server 102 may attempt to reschedule the user session with the user. Additionally and/or alternatively, the user interaction server 102 may request feedback from the user for reasons why the user session was declined. As described above, the user interaction server 102 may, for example, use the feedback to train the machine-learning model to more accurately determine when, and if, to initiate the user session.

In some implementations, the user interaction server 102 may select an interface for the user session. Selecting the interface may involve selecting the type of interface (e.g., audio, visual, or hybrid) and selecting at least one device to provide the interface to the user. In an example, the user interaction server 102 may select the interface based on a predetermined user preference. Specifically, the user may have indicated that the user interaction server 102 establish a user session with the user via a mobile application. In another example, the user interaction server 102 may select a default interface when establishing the user session. Once the interface is selected, the user interaction server 102 may initiate the user session.

As illustrated in FIG. 1, the user interaction server 102 includes or is associated with a user interface manager 110. The user interface manager 110 may be any application or program associated with or connected to a financial institution and can include applications for managing a user interface of the user session. The user interface manager 110 in the current description provides an application through which the user interaction server 102 can obtain information about a user session. Additionally, the user interaction server 102 can use that information to evaluate an interface of the user session, and can interact with the user device 104, the audio-based device 106, and the smart device ecosystem 108 (e.g., via queries, interactive messages, and user inputs) to adjust or change the user interface based on the described analysis.

In some implementations, the user interface manager 110 may be associated with or can include an interface management system used to monitor an ongoing user session and to detect a scenario for adjusting the interface of the user session. That is, the user interface manager 110 may determine that a change to the current interface of the user session is needed in order to continue the user session in an effective and productive manner. After the detection, the user interface manager 110 can present possible new interfaces to the user, and in response to acceptance of one of those interfaces, can send instructions to user devices that will provide the new interface. As illustrated, the user interface manager 110 includes a plurality of components, although some or all may be included in the inherent functionality of the user interface manager 110, provided as a separate component from the user interface manager 110, or included in one or more of the other components. The illustrated user interface manager 110 includes a complexity analyzer 112, a contextual analyzer 114, and a user data analyzer 116. These components combine to perform the operations associated with the user interface manager 110, although alternative, additional, or combined components may perform the operations in other instances or implementations. Specifically, one or more programs, applications, or other components may perform combinations of the functionality described herein, and are not meant to require separate or disparate components. Further, while the functionality of the user interface manager 110 is described separately, multiple functions may be combined and performed by a single component, while other functions may be separated and performed by two or more components, where those separate functions may be performed individually or in combination with one another.

In an embodiment, the user interface manager 110 may determine to perform an interface change based on analysis provided by the complexity analyzer 112. Specifically, the complexity analyzer 112 may provide the user interface manager 110 with a complexity level of the information (e.g., financial information) and/or services to be provided to the user. Based on the complexity level of the information and/or services, the user interface manager 110 may determine to perform an interface change, perhaps in response to determining that the complexity level is greater than a threshold complexity level associated with the current interface. Once the user interface manager 110 determines to perform an interface change, the manager may then use the analysis provided by the complexity analyzer 112, the contextual analyzer 114, and the user data analyzer 116 to select a new interface and determine whether the new interface satisfies relevant user preferences. If the selected new interface satisfies the user preferences, then the user interface manager 110 may instruct user devices to seamlessly change interface of the user session to the new interface.

In some implementations, the complexity analyzer 112 can perform real-time analyses of the information that is currently being presented to the user and/or information that is to be presented to the user. Specifically, the complexity analyzer 112 can analyze the information to determine a complexity level of the information. In an implementation, the complexity analyzer 112 may analyze: (i) a type of the information (e.g., illustrations, visual guides, and tutorials), (ii) a medium of the information (e.g., visual, audio, or both), (iii) a complexity of associated visual information (e.g., amount of text evaluated in light of current interface/size of interface), and (iv) a depth level of the information (e.g., long lists, comparison charts, contracts). Additionally and/or alternatively, the complexity analyzer 112 may analyze user feedback associated with the information. For example, a user may provide feedback of the complexity level of the information once the information is reviewed by the user. Using the feedback from one or more users, the complexity analyzer 112 may determine the complexity level of the information. Once the complexity analyzer 112 determines the complexity level of the information that is currently being provided to the user and/or the information to be provided to the user, the complexity analyzer 112 may provide the complexity level to the user interface manager 110.

In some implementations, the contextual analyzer 114 can analyze contextual data associated with the user session. The contextual data may include data that is received from user devices, such as the smart device ecosystem 108. For example, the smart device ecosystem 108 may provide data indicative of a local environment in which the user, the user device 104, the audio-based device 106, and the smart device ecosystem 108 may be located. Additionally and/or alternatively, other devices associated with the user, such as smartphones, head-mountable devices (HMDs), and wearable devices, may provide contextual data indicative of the user. The contextual analyzer 114 may analyze the contextual data in real-time to determine one or more real-time characteristics of the local environment and/or of individuals located in the local environment (including the user). Examples of the characteristics of the local environment include a number and type of user devices available to the user in the local environment. Examples of the characteristics of the individuals include a number of individuals located in the local environment, whether any individuals are located in proximity to the user or in a potential location of the recommended second interface, a current mood of the user, a current state of the user (e.g., awake, sleeping, idle, performing an activity). Once the contextual analyzer 114 determines real-time characteristics of the local environment and/or of individuals located in the local environment, the contextual analyzer 114 may provide the data to the user interface manager 110.

In some implementations, the user data analyzer 116 can analyze user preferences in order to determine relevant user preferences for the ongoing user session. The user preferences may have been provided by the user during a previous or the current user session. The user preferences may also be intelligently determined by the user interaction server 102 based on feedback from the user. As an example, the user preferences may include a preferred interface for a type of information and/or service. For instance, the user preferences may indicate that a preferred interface for account information is a graphical user interface (GUI) provided on a smart user device, such as a smartphone or smart TV. As another example, the user preferences may include user privacy preferences. For instance, the user privacy preferences may indicate the individuals, if any, that may view the financial information and/or services that are provided to the user. For instance, the user privacy preferences may indicate that the user's partner may have access to all of the financial information and/or services that are provided to the user. The user data analyzer 116 can analyze the user preferences to determine relevant user preferences for the current user session. For example, if the contextual analyzer 114 indicates that there are individuals located in proximity of the user, the user data analyzer 116 may determine that user privacy preferences are relevant for the current user session. The user data analyzer 116 may then provide the relevant user preferences to the user interface manager 110.

In an embodiment, user interface manager 110 can analyze the analysis provided by each of the complexity analyzer 112, the contextual analyzer 114, and the user data analyzer 116. First, the user interface manager 110 may analyze the complexity analysis of the information and/or services, the contextual analyzer 114, and the user data analyzer 116 to determine whether an interface change should be performed. Based on the complexity level of the financial information and/or services, the contextual data, and/or the relevant user preferences the user interface manager 110 may determine to perform an interface change. For example, the user interface manager 110 may determine that the complexity level is greater than a threshold complexity level. If the complexity level of the information satisfies the threshold level, then the user interface manager 110 may analyze the analysis of the complexity analyzer 112 and the contextual analyzer 114 to determine what interfaces, if any, can be provided in the local environment. Specifically, the user interface manager 110 may determine available interfaces that may be suitable for presenting information at the determined level of complexity. In an example, different interfaces may be categorized according to maximum level of complexity that can be handled by the interface and/or the different types of media that can be handled by the interface. Once the possible interfaces are determined, the user interface manager 110 may determine whether the possible interfaces satisfy the relevant user preferences. The one or more possible interfaces that satisfy the relevant user preferences can be designated as recommended interfaces. As described herein, selecting the interface may involve selecting the type of interface (e.g., audio, visual, or hybrid) and selecting at least one device to provide the interface to the user. In some implementations, the user interface manager 110 may determine different options for implementing the recommended interfaces. For example, the user interface manager 110 may determine whether the recommended interfaces can be implemented by casting a GUI from one device to another (e.g., from a smartphone to a smart TV), by driving the interface from the cloud, or initiating a de-coupled presentation. In some implementations, a machine-learning model can be used to determine the new interface. Specifically, the machine-learning model can refine the contact methods based on user feedback.

In some implementations, the user interface manager 110 may present to the user the recommended interfaces and the different options for implementing the recommended interfaces, perhaps via the current interface. In some instances, once the recommended interfaces are determined, a list of the recommended interfaces may be generated and formatted for presentation to the user, and transmitted via the communication system 120 to the user device that is providing the current interface. The list may rank the recommended interfaces according to context (e.g., what needs to be presented), optimality, location, and/or scheduled timing. For example, if the current interface is an audio interface, the list of recommended interfaces may be transmitted to the audio-based device 106. The audio-based device 106 may provide the list of recommended interfaces to the user for selection. In response to receiving a selection of a particular interface, the selection can be provided to the user interface manager 110. The user interface manager 110 may then generate one or more instructions for one or more devices to provide the new interface to the user. The user interface manager 110 may then provide the instructions to the corresponding devices so that the new interface can be provided to the user.

Memory 122 of the user interaction server 102 may represent a single memory or multiple memories. The memory 122 may include any memory or database module and may take the form of volatile or non-volatile memory including, without limitation, magnetic media, optical media, random access memory (RAM), read-only memory (ROM), removable media, or any other suitable local or remote memory component. The memory 122 may store various objects or data, including financial data, user and/or account information, administrative settings, password information, caches, applications, backup data, repositories storing business and/or dynamic information, and any other appropriate information associated with the user interaction server 102, including any parameters, variables, algorithms, instructions, rules, constraints, or references thereto. Additionally, memory 122 may store any other appropriate data, such as VPN applications, firmware logs and policies, firewall policies, a security or access log, print or other reporting files, as well as others. While illustrated within the user interaction server 102, memory 122 or any portion thereof, including some or all of the particular illustrated components, may be located remote from the user interaction server 102. In some instances, memory 122 may be located as a cloud application or repository, or as a separate cloud application or repository when the user interaction server 102 itself is a cloud-based system. In other instances, some or all of memory 122 may be located in, associated with, or available through one or more other financial systems of the associated financial institution. In those examples, the data stored in memory 122 may be accessible, for example, via software applications installed on user devices (e.g., application 150 and application 168).

As illustrated, memory 122 includes a plurality of customer accounts 124. Each customer account 124 may include information on the user's available funds 126 and one or more credit accounts 128. Funds 126 may represent cash and/or debit accounts, while the credit accounts 128 may include credit-based accounts and other credit facilities (e.g., credit cards, lines of credit, home equity lines of credit). The credit account 128 information may include current credit balances, credit limits, and other relevant information. The credit account 128 information may include information on credit terms, including specialized terms associated with different purchase types, loyalty and reward information, promotional balance offers, and other information related to the actual usage of credit, including rules for the usage of the credit and any promotions or limitations. Each customer account 124 may also include one or more financial products 130. The one or more financial products 130 may information about other financial accounts, such as investment accounts and retirement accounts. The memory 122 may also include financial services 132. The financial services 132 may include data associated with financial services that are provided by the financial institution, such as financial advice services. The data can include teaching materials, such as documents, tutorials, videos, audio lectures, guides, among other examples. As described herein, data from the financial services 132 may be presented to a user during a user session. In non-financial examples, the customer accounts 124 can include information about the user and the information being presented, as appropriate.

As illustrated, the system 100 may include one or more user devices that may be associated with one or more customer accounts 124, either as a client device at which the customer of the customer account 124 is linked, or as a client device through which the particular customer accesses financial information and/or services. In this example, the one or more user devices include the user device 104 and the audio-based device 106. Other devices, perhaps of different types, may be included in the system 100.

The illustrated user device 104 is intended to encompass any computing device such as a desktop computer, laptop/notebook computer, mobile device, smartphone, personal data assistant (PDA), tablet computing device, internet-of-things device (e.g., a smart television, a smart projector, a virtual reality (VR) device, an augmented reality (AR) device, etc.), one or more processors within these devices, or any other suitable processing device. In general, the user device 104 and its components may be adapted to execute any operating system, including Linux, UNIX, Windows, Mac OS®, Java™, Android™, or iOS. In some instances, the user device 104 may comprise a computer that includes an input device, such as a keypad, touch screen, or other device(s) that can interact with one or more client applications, such as one or more dedicated mobile applications, including a mobile application 150. Additionally, the computer may comprise an output device that conveys information associated with the operation of the applications and their application windows to the user of the user device 104. Such information may include digital data, visual information, or a GUI 152, as shown with respect to the user device 104. Additionally and/or alternatively, the user device 104 may allow for voice presentations and voice interactions to be performed, such as by presenting information or options via a speaker, and then receiving responsive input via a microphone of the user device 104. Specifically, the user device 104 may be any computing device operable to communicate with the user interaction server 102, other user devices (e.g., the audio-based device 106), and/or other components via network 154, as well as with the network 154, using a wireline or wireless connection. In general, user device 104 comprises an electronic computer device operable to receive, transmit, process, and store any appropriate data associated with the environment of FIG. 1.

The client applications executing on the user device 104 may include any suitable application, program, mobile app, or other component. Client applications can interact with the financial institution applications and the user interaction server 102 via network 154. In some instances, the client application may be a web browser, where the functionality of the client application may be realized using a web application or website the user can interact with via the client application. In other instances, the client application may be a remote agent, component, or client-side version of the user interaction server 102, financial institution, or another component. In some instances, the client application may interact directly with the user interaction server 102 or portions thereof. The client application may be used to initiate or trigger a card modification analysis based on user input, and/or may be used to present information associated financial information and/or services provided to the user.

The application 150 may be an application associated with the financial institution, and can be used, along with memory 148 (which may be similar to or different from memory 122), to store financial information and/or services. As shown in FIG. 1, the application 150 may include a GUI 152. GUI 152 interfaces with at least a portion of the system 100 for any suitable purpose, including generating a visual representation of any particular client application, the application 150, and/or the content associated with any components of the user interaction server 102. In particular, GUI 152 may be used to present financial information and/or services, as well as to otherwise interact and present information associated with one or more applications. GUI 152 may also be used to view and interact with various web pages, applications, and web services located local or external to the user device 104. Generally, GUI 152 provides the user with an efficient and user-friendly presentation of data provided by or communicated within the system. GUI 152 may comprise a plurality of customizable frames or views having interactive fields, pull-down lists, and buttons operated by the user. In general, GUI 152 is often configurable, supports a combination of tables and graphs (bar, line, pie, status dials, etc.), and is able to build real-time portals, application windows, and presentations. Therefore, GUI 152 contemplates any suitable graphical user interface, such as a combination of a generic web browser, a web-enable application, intelligent engine, and command line interface (CLI) that processes information in the platform and efficiently presents the results to the user visually.

The user device 104 includes one or more input/output device 142. The one or more output devices may include, for example, a speaker and a display (e.g., a touchscreen). Generally, the output devices of the user device 104 are capable of providing audio output, visual output, and/or other types of non-audio output (e.g., tactile or haptic output). In some examples, the display may be part of a touchscreen. The touchscreen may include the display, which may be a color liquid crystal display (LCD), light-emitting diode (LED) display or active-matrix organic light-emitting diode (AMOLED) display, with a touch-sensitive input surface or overlay connected to an electronic controller. The one or more input devices may include, for example, audio input devices (e.g., a microphone), video input devices (e.g., a camera), buttons, switches, dials, a keyboard or keypad, or navigation tool, depending on the type of user device 104. In some examples, an output device (e.g., a touchscreen) may also serve as an input device. A visual interface, such as a GUI (e.g., GUI 152), may be rendered and displayed on the touchscreen. A user may interact with the GUI using the touchscreen and optionally other input devices (e.g., buttons, dials) to display relevant information, such as financial information and/or services. Generally, the user device 104 may be configured to process primarily non-audio input and to provide primarily non-audio output.

The user device 104 also includes peripheral(s) 160 and communication system 146. The peripheral(s) 140 may include a biometric sensor, a motion sensor, a camera, a microphone, an infrared (IR) sensor and/or a proximity sensor. The communication system 146 may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network). The communication system 146 may communicate with any one of a plurality of fixed transceiver base stations of the cellular network within its geographic coverage area. The wireless transceivers may include a multi-band cellular transceiver that supports multiple radio frequency bands. Other types of short-range wireless communication include near field communication (NFC), IEEE 802.15.3a (also referred to as UltraWideband (UWB)), Z-Wave, ZigBee, ANT/ANT+ or infrared (e.g., Infrared Data Association (IrDA) communication). The wireless transceivers may include a satellite receiver for receiving satellite signals from a satellite network that includes a plurality of satellites that are part of a global or regional satellite navigation system. As illustrated, the user device 104 may also include at least one processor 144, which may be similar to or different from processor 118.

Examples of the user device 104 include, but are not limited to, handheld or mobile wireless communication devices, such as smartphones, tablets, laptop or notebook computers, netbook or ultrabook computers; as well as vehicles having an embedded-wireless communication system, such as a Wi-Fi or cellular equipped in-dash infotainment system, or tethered to another wireless communication device having such capabilities. Mobile wireless communication devices may include devices equipped for cellular communication through PLMN or PSTN, mobile devices equipped for Wi-Fi communication over WLAN or WAN, or dual-mode devices capable of both cellular and Wi-Fi communication. In addition to cellular and Wi-Fi communication, a mobile wireless communication device may also be equipped for Bluetooth and/or NFC communication. In various embodiments, the mobile wireless communication device may be configured to operate in compliance with any one or a combination of a number of wireless protocols, including Global System for Mobile communications (GSM), General Packet Radio Service (GPRS), 30 code-division multiple access (CDMA), Enhanced Data GSM Environment (EDGE), Universal Mobile Telecommunications System (UMTS), Evolution-Data Optimized (EvDO), High Speed Packet Access (HSPA), 3rd Generation Partnership Project (3GPP), or a variety of others. It will be appreciated that the mobile wireless communication device may roam within and across PLMNs. In some instances, the mobile wireless communication device may be configured to facilitate roaming between PLMNs and WLANs or WANs.

The illustrated audio-based device 106 is intended to be a primarily audio device (e.g., a smart speaker), having only or primarily audio input devices such as a microphone, and having only or primarily audio output devices such as a speaker. As illustrated, the audio-based device 106 may include peripherals 160 (similar to or different from peripherals 140), input/output devices 162 (similar to or different from input/output devices 142), processors 164 (similar to or different from processors 144), communication system 172 (similar to or different from communication system 146), and memory 166 (similar to or different from memory 148).

As also illustrated in FIG. 1, the memory 166 may include an application 168 that provides an audio interface 170. The application 168 includes instructions for implementing the audio interface 170 (e.g., a voice user interface (VUI)), to enable a user to interact with and provide instructions to the audio-based device 106 via audio (e.g., voice) input. The application 168 may also include a natural language processing (NLP) function to enable audio input to be analyzed into commands, input and/or intents, for example. Other applications such as mapping, navigation, media player, telephone, and messaging applications, etc. may also be stored in memory 166. The application 168 allows the audio-based device 106 to perform at least some embodiments of the methods described herein. The memory 166 stores a variety of data, including sensor data acquired by the device; user data including user preferences, settings and possibly biometric data about the user for authentication and/or identification; a download cache including data downloaded via the wireless transceivers; and saved files. System software, software modules, specific device applications, or parts thereof, may be temporarily loaded into RAM. Communication signals received by the audio-based device 106 may also be stored in RAM. Although specific functions are described for various types of memory, this is merely one example, and a different assignment of functions to types of memory may be used in other embodiments.

The illustrated smart device ecosystem 108 can include sensors 180, cameras 182, and audio-detection devices 184. The one or more sensors 180 may include a motion sensor, an infrared (IR) sensor, and/or a proximity sensor, motion capture sensors, scanners, light detection and ranging (LIDAR) sensors, point cloud sensors, inertial measurement unit (IMU), ultrasonic range sensors, Global Positioning System (GPS) receivers, sonar, optical sensors, Radio Frequency identification (RFID) systems, Near Field Communication (NFC) chips, wireless sensors, radio sensors, and/or range sensors (e.g., ultrasonic and/or infrared), among others, and/or combinations thereof. The cameras 182 may include color cameras, grayscale cameras, and/or infrared cameras. The audio-detection devices 184 may include microphones. The devices of the smart device ecosystem 108 may be communicatively coupled to one another via wireless and/or wired connections, perhaps through network 154. The smart device ecosystem 108 may be spaced around the local environment. The local environment may be a room, a number of rooms, a house, apartment, condominium, hotel, or other similar location. As described herein, at least a portion of the data collected by the smart device ecosystem 108 may be provided to the user interaction server 102. The portion of the data that is provided may be based on user approval and/or user privacy settings.

While FIG. 1 includes the audio-based device 106 as the device that provides the first interface in system 100, other types of devices can be instead of or in addition to the audio-based device 106 to provide the first interface. For example, a mobile computing device (e.g., a smartphone) can provide the first interface to the user. In an example scenario, the user interface manager 110 may determine to change the first interface (e.g., a GUI) provided by the mobile computing device to a new interface based on a determination that a screen size of the mobile computing device is not adequate to provide the desired information to the user and that a larger screen (e.g., a smart TV) is available to the user. Then, the user interface manager 110 may change the interface of the user session to the new interface, which may be provided at least in part by the larger screen.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
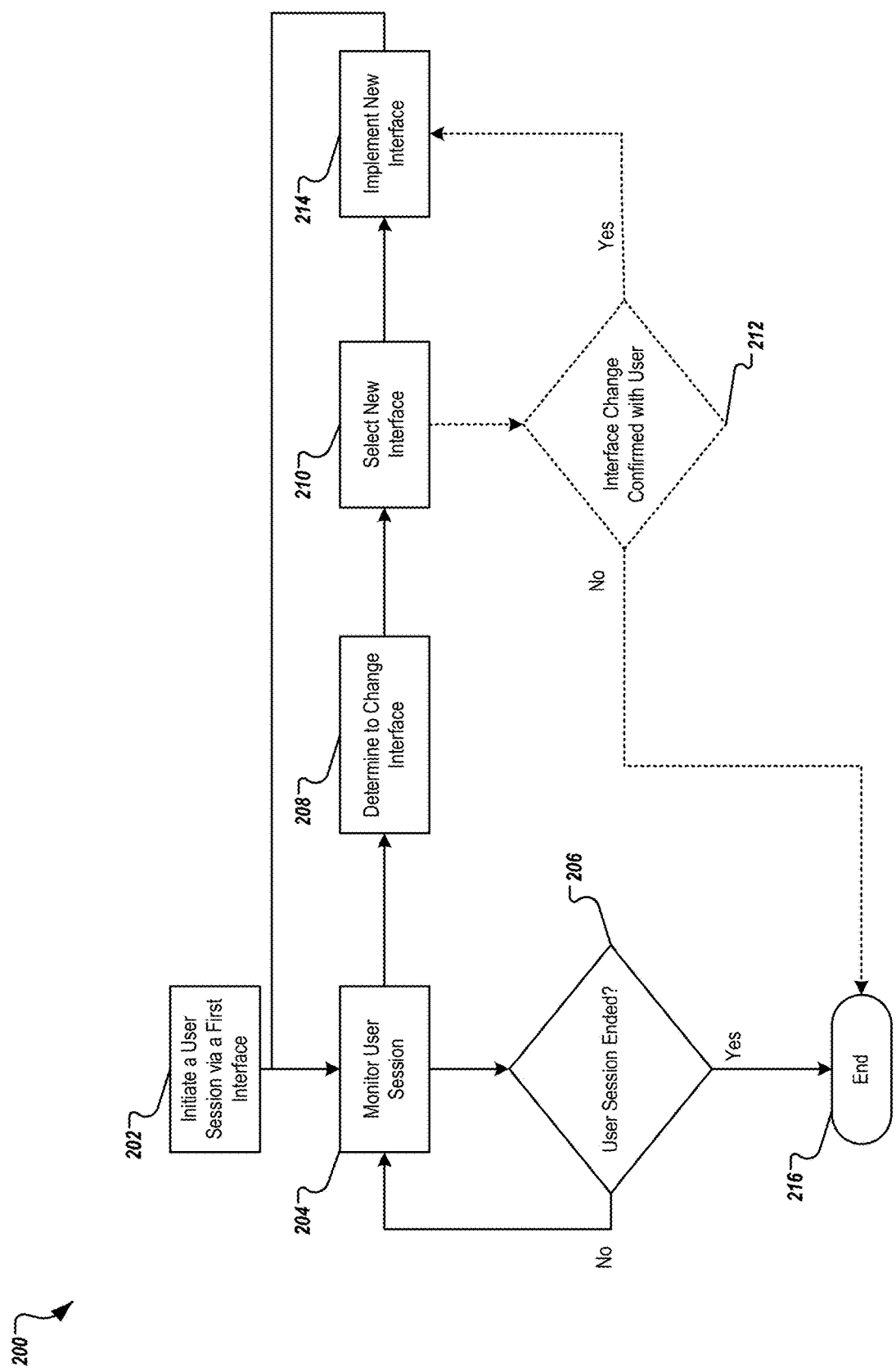
FIG. 2 is a diagram of an example workflow for dynamically determining an interface for presenting information and/or services to a user, according to some implementations of the present disclosure.

FIG. 2 is a diagram of an example workflow for dynamically determining an interface for presenting information and/or services to a user. The diagram 200 provides an example series of actions performed by a server of a financial institution, e.g., the user interaction server 102 of FIG. 1, which is also referred to as a controller system. Some of the actions in the diagram 200 may involve the controller system interfacing with other devices, such as the user's devices.

At block 202, a user session between a user and a financial institution is initiated via a first interface. In one implementation, the user may initiate the user session, perhaps by interacting with a device that is providing the first interface. Specifically, the user may provide instructions via the interface to access financial information and/or services from the financial institution in this illustrated instance. In the example where the first interface is an audio interface, the user may initiate the user session by an audio command that may include one or more predetermined phrases (e.g., phrases associated with the audio-based device or the audio interface). Such an audio interface may be provided by an audio-based device (e.g., audio-based device 106 of FIG. 1) or may be provided by a user device that includes an audio-based virtual assistant. In the example where the first interface is a visual interface, the user may initiate the user session by an audio command, a physical input into a user device, and/or a physical gesture. The visual interface, e.g., a GUI of a software application, may be provided by a user device (e.g., user device 104).

In another implementation, the user session may be initiated autonomously, perhaps by a controller system of the financial institution (e.g., user interaction server 102). Specifically, event triggers and/or contextual data can be used to determine when, and if, to autonomously initiate the user session. In an example, the controller system can use contextual data to determine whether to initiate a user session in response to detecting an event trigger. Specifically, the controller system can use the contextual data to derive insights indicative of a status of the user and/or a status of the user's local environment. For example, the user's smartphone data (e.g., in a phone call, texting, web browsing, etc.), wearable device data (e.g., indicating that the user is exercising, traveling, sleeping, etc.), calendar data, and smart device ecosystem data can be used to derive insights such as the user's availability (e.g., current or future availability), the user's mood (e.g., good mood, irritable mood, etc.), user's location, the user's level of privacy, and proximity of individuals to the user. These insights can be used to determine whether to initiate a user session in response to detecting an event trigger. For example, the controller system may make decisions based on business rules that consider data such as the status of the user and/or the status of the user's local environment. For example, if the controller system determines that the user is not currently preoccupied with an activity, is in a good mood, and has privacy, then the controller system may determine to initiate the user session, perhaps in response to detecting an event trigger. In some implementations, the event trigger may be designed as urgent (e.g., an event trigger that involves a threshold amount of money or that involves fees/penalties). In such implementations, the controller system may determine to initiate the user session even if the status of the user and/or the status of the user's environment indicate that it may not be an ideal time to do so. In some implementations, as described herein, a machine-learning model can be trained to determine when, and if, to initiate a user session.

In some implementations, initiating the user session may involve an authentication process. The authentication process may be active or passive. Examples of authentication processes include authenticating through a user device (e.g., entering a pin/passcode physically or verbally) and biometric authentication (e.g., facial recognition, fingerprint recognition). Once the user session is authenticated, the user can interact with the first interface in order to receive financial information and/or services from the financial institution.

At block 204, once the user session is initiated, the user session is monitored. In an implementation, the controller system monitors the user session to determine when, and if, an interface change is needed. Generally, the controller system monitors the user session to detect a scenario where the first interface is no longer suitable for presenting financial information and/or services to the user. For instance, during the user session, the controller system may seek to provide the user with information and/or services that may be challenging to provide via the first interface. In the example where the first interface is an audio interface, it may be challenging or not feasible to provide the user with complex illustrations, in-depth information (e.g., long lists, comparisons), or visual information (e.g., tutorials or visual guides). In response to detecting such a scenario, the controller system may determine to change the interface to a new interface that is better suited for providing the desired information and/or services to the user.

More specifically, monitoring the user session may involve monitoring the information that is being or will be presented to the user (e.g., complexity, confidentiality, and/or difficulty analysis), contextual data, user device data, data from the smart device ecosystem, the user's preferences, among other data for an indication that the first interface is no longer suitable for presenting information to the user. Such scenarios include: (i) determining that the information is too complex to be provided effectively via the first interface, (ii) determining that it is too difficult or not feasible to provide the information via the first interface, (iii) determining that the confidentiality of the information may be compromised, and (iv) detecting a change in the user's status and/or the status of the user's environment. Changes in the user's status and/or the status of the user's environment include (but are not limited to): (i) a change in the user's location, (ii) a change in the user's current activity, (iii) a change in a noise level of the user's environment, and (iv) a change in the individuals that are located in proximity of the user.

At block 206, while monitoring the user session, it is periodically determined whether the user session has ended. If the user session has ended, then the workflow may be terminated at block 216. Conversely, if the user session is ongoing, monitoring the user session is resumed.

At block 208, it is determined to change the interface from the first interface to a new interface. In an implementation, the controller system determines to change the interface in response to detecting a scenario where the first interface is no longer suitable for presenting the current set financial information and/or services to the user. In some implementations, the determination is made as information is provided to the device(s) implementing the first interface, or when information is to be sent over. In the example where the first interface is an audio interface, the controller system may determine to change the interface in response to determining that the information to be provided to the user includes a comparison of multiple options. Changing the interface may include (i) adding another interface to the user session (e.g., by shifting at least a portion of the interface to a new device), (ii) removing an interface from the user session (e.g., by removing at least one device that is providing the interface), and (iii) adjusting one or more properties of the current interface.

At block 210, a new interface is selected. In an implementation, the new interface is selected based on the information that is being or will be presented to the user (e.g., complexity and/or difficulty analysis), contextual data, user device data, data from the smart device ecosystem, and/or the user's preferences. Specifically, the controller system may analyze the data to select a new interface that is suitable for presenting the desired information and/or services to the user. In an example, to select a new interface, the contextual data is analyzed to determine devices in the user's environment that are available for implementing the new interface. Then, one or more devices that can present the desired information are selected from the available devices. From the one or more devices, at least one device is selected that that satisfies any applicable user preferences. In some implementations, a machine-learning model can be used to determine the new interface. As described above, the machine-learning model can refine the contact methods based on user feedback.

In some implementations, at block 212, the interface change is confirmed with the user. In an example, the confirmation may involve a simple inquiry to the user, such as "Do you confirm an interface change?" In another example, the controller system may provide a list of the selected devices to the user. The list may rank the recommended devices according to context (what needs to be presented), optimality, location, and/or scheduled timing.

Once the confirmation request is sent to the user, the controller system may await the confirmation from the user. If the user declines the interface change, then the controller system may move to block 216 and the workflow is terminated. Conversely, if the user confirms the interface change and/or selects a desired device, the controller system proceeds to block 214.

At block 214, the interface change is implemented. Note that in some implementations, perhaps if the user preferences indicate as such, the controller system may not confirm the change with the user between blocks 210 and 214. Rather, the controller system may move directly from block 210 to block 214. In an implementation, implementing the interface change may involve sending instructions to one or more devices, such as the one or more devices that are implementing the current interface and/or the one or more devices that will implement the new interface. In some instances, the device on which the current interface is being presented may be instructed to cast, or otherwise share, information to be presented on the new interface. Once the new interface is implemented, the workflow returns to block 204 of monitoring the user session.

Figure 3:
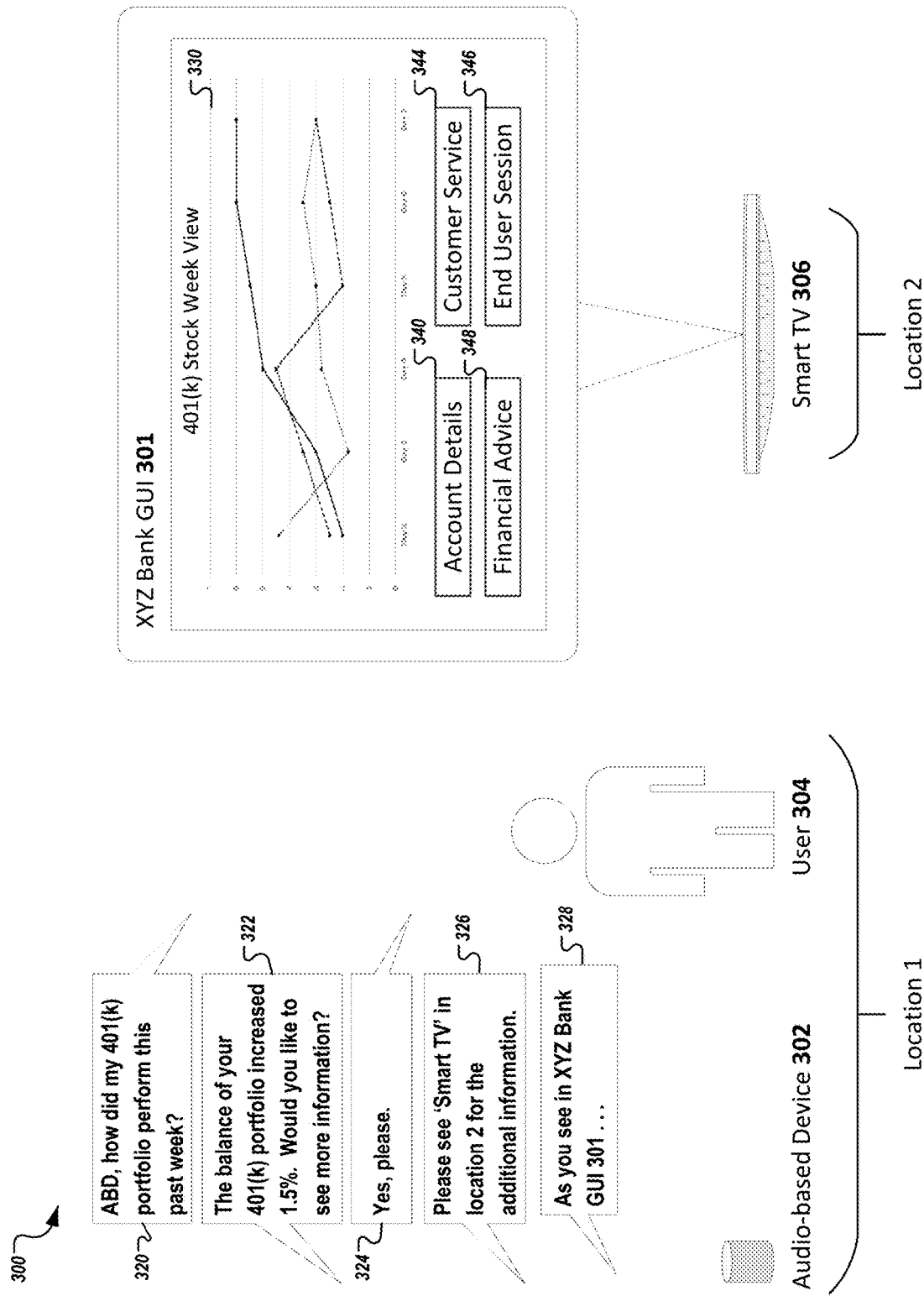
FIG. 3 is an example scenario of presenting information and/or services to a user, according to some implementations of the present disclosure.

FIG. 3 illustrates an example scenario 300 of presenting financial information and/or services to a user 304. In this example scenario, the user 304 is a customer of a financial institution, XYZ Bank. The financial institution, as part of services provided to its customers, allows the customers to access financial information and/or services via a plurality of interfaces. For example, the financial institution allows customers to access financial information and/or services via Web browsers, web applications, or other software applications. In an embodiment, the financial institution may operate a user interaction server (not illustrated in FIG. 3) that interfaces with user devices through which customers may access the financial information.

In an embodiment, the user 304 may be located in location 1 of a local environment. As also showing in FIG. 3, an audio-based device 302 may also be located in location 1. The user 304 may interact with the audio-based device 302 using audio commands, which may include predetermined phrases that are associated with the audio-based device 302. In an implementation, an application that is developed by XYZ bank may be installed on the audio-based device 302. In this implementation, the user 304 may use audio commands to receive financial information and/or services from the financial institution via the audio interface provided by the audio-based device 302. Example audio commands or questions include "Where is the nearest branch?", "What types of accounts do you offer?", "What's the current XYZ stock price?", "What is the buy rate for US dollars?", and "I have a problem, how do I contact XYZ bank?"

FIG. 3 shows an example user session between the user 304 and the user interaction server. In this example, the user 304 initiates the user session by interacting with the audio-based device 302 via the audio interface. Specifically, as indicated in callout box 320, the user 304 asks the audio-based device 302 via the audio interface, "Audio-based device (ABD), how did my 401(k) portfolio perform this past week?" In response to this inquiry, the audio-based device 302 sends a request to initiate a user session to the user interaction server. Given that the user session has been initiated, the user interaction server begins to monitor the user session to detect a scenario where the first interface may no longer be suitable for providing information and/or services to the user 304.

The audio-based device 302 then requests and receives the desired information from the user interaction server, perhaps through a dedicated API. The audio-based device 302 may then provide this information to the user 304 via the audio interface. Specifically, as indicated in callout box 322, the audio-based device 302 may generate an audio response stating, "The balance of your 401(k) portfolio increased 1.5%. Would you like to see more information?" In response, as indicated in callout box 324, the user 304 replies stating, "Yes, please." Here, the user interaction server may determine to change an interface of the user session. Specifically, the user interaction server may determine that providing additional information regarding the 401(k) portfolio may be difficult to achieve using the audio interface.

In an embodiment, in response to determining to change the interface, the user interaction server may select a new interface. Specifically, the user interaction server may select the new interface based on the information that will be presented to the user (e.g., complexity and/or difficulty analysis), contextual data, user device data, data from the smart device ecosystem located in the local environment, and/or the user's preferences. In this example, the user interaction server may determine that the new interface is a hybrid audio-visual interface. Specifically, the user interaction server may determine that the visual aspect of the new interface is to be provided by "Smart TV 306," which is a user device that is located in location 2 of the local environment. Location 2 in the local environment may be the same location as location 1 or may be a nearby location (e.g., an adjacent room). Furthermore, the user interaction server may determine that the audio portion of the hybrid audio-visual interface is to be provided by the audio-based device 302 or another audio-based device. Once the user interaction server has selected the new interface, the user interaction server may send the desired information to the corresponding devices in order to provide the information to the user 304 via the new interface. In this example, as shown by box callout 326, the audio-based device instructs the user 304 to turn their attention to the smart TV 306 by stating, "Please see 'Smart TV' in location 2 for the additional information."

As shown in FIG. 3, a XYZ Bank GUI 301 may be displayed on a display of the smart TV 306. In this example, the GUI 301 includes a chart 330 with the requested information. The GUI also includes navigation buttons 340, 344, 346, and 348. The GUI 301 is the visual portion of the hybrid interface. The user 304 can interact with the GUI 301 in order to access financial information and/or services. Additionally, since the new interface is a hybrid interface, the audio-based device 302 may continue to interact with the user 304 via the audio interface. For instance, the audio-based device 302 may be present information to the user 304 as part of the new interface. For, the audio-based device 302 can output audio that explains to the user 304 aspects of the information presented on the GUI 301. As shown by box callout 328, the audio-based device 302 may output audio that directs the user 304 to the GUI 301 and explains the information displayed in the GUI 301.

While FIG. 3 includes the audio-based device 302 as the device that provides the first interface, other types of devices can be instead of or in addition to the audio-based device 302 to provide the first interface. The first interface can be provided by a single device or a plurality of devices (e.g., a hybrid interface provided by multiple devices). Additionally, although the new interface in FIG. 3 is provided by the smart TV 306, other types of devices can be instead of or in addition to the smart TV 306 to provide the new interface. The new t interface can be provided by a single device or a plurality of devices (e.g., a hybrid interface provided by multiple devices).

Figure 4:
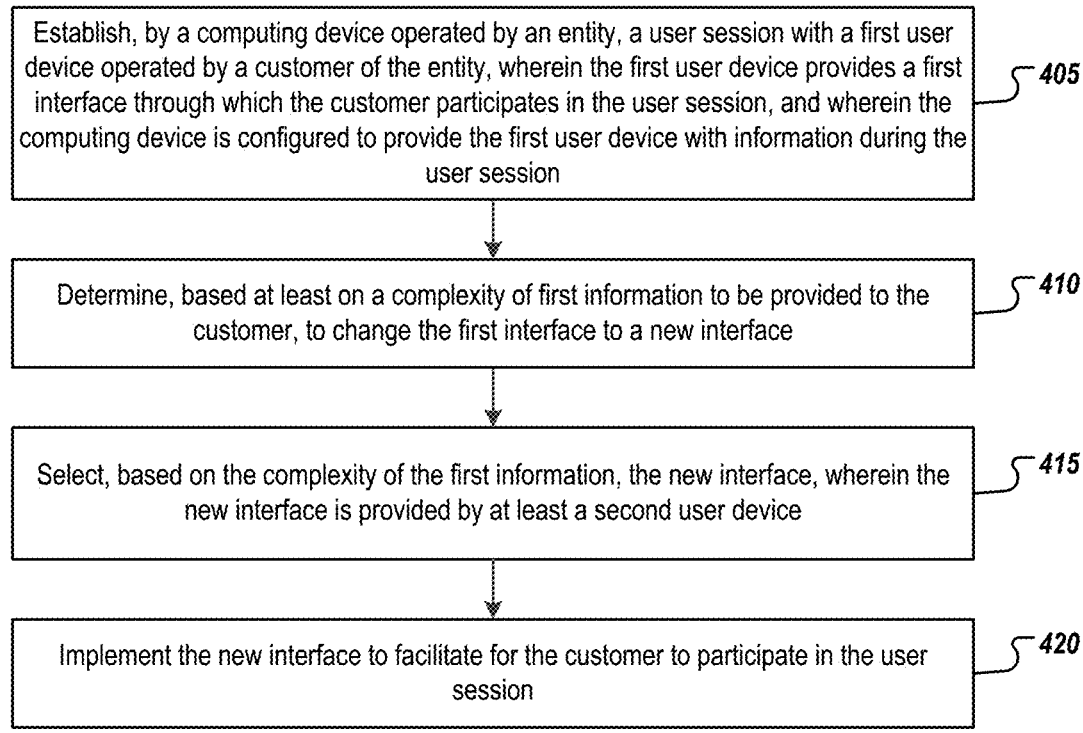
FIG. 4 is a flowchart of an example method for selecting interface for presenting information and/or services to a user, according to some implementations of the present disclosure.

FIG. 4 is a flow diagram of an example method 400 proactively selecting interface for presenting information and/or services to a user in one example implementation. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate. In some instances, method 400 can be performed by the user interaction server 102, or portions thereof, described in FIG. 1, as well as other components or functionality described in other portions of this description.

In one instance, method 400 describes a method performed within a system of a financial institution or card provider comprising a communications module, at least one memory, and at least one hardware processor interoperably coupled with the at least one memory and the communications module. The at least one memory can include a repository storing a plurality of account profiles for one or more customers, a repository storing data associated with and defining a plurality of financial products offered by the financial institution or card provider, and a repository storing teaching materials and tutorials developed by the financial institution or card provider. The memory may also store instructions that instruct the at least one hardware processor to perform particular operations.

Turning to method 400, at 405 a user session with a first user device operated by a customer of an entity is established. The entity can be the financial institution or card provider. Furthermore, the first user device provides a first interface through which the customer participates in the user session, and the computing device is configured to provide the first user device with information during the user session.

In some instances, establishing the user session with the first user device involves receiving, from the first user device, a request to establish the user session with the first user device.

In some instances, establishing the user session with the first user device involves determining, based on at least on one of event triggers or contextual data, to establish the user session with the first user device.

In some instances, one or more events, actions, transactions, or combinations thereof may be associated with the triggering event. In some instances, the triggering event may be a determination that the first customer initiates a transaction that exceeds a transaction threshold amount. In other instances, a determination that a number of transactions performed over a period of time exceed a threshold cumulative number of transactions may trigger the analysis. Any suitable analysis triggers may be defined and evaluated within the system based on individual and cumulative customer actions. In some instances, the triggering event may be an automatic, periodic or other time-based customer account analysis, and may be triggered apart from any particular transactions or interactions of the customer. In still other instances, the triggering event may be based on a user login to a website of the financial institution, or a manual request for the analysis initiated by the customer or by another authorized user or customer service agent.

At 410, it is determined, based at least on a complexity of first information to be provided to the customer, to change the first interface to a new interface. In some implementations, determining, based at least on a complexity of first information to be provided to the user, to change the first interface to a new interface involves analyzing the first information to determine a complexity level for the first information; and determining that the complexity level of the first information is greater than a threshold complexity level associated with the first interface.

At 415, the new interface is selected based on the complexity of the first information. In some implementations, selecting, based on the complexity of the first information, the new interface, involves: determining, based on contextual data, at least one available interface for the user; and selecting, from the at least one interface, a subset of interfaces that are associated with a respective threshold complexity level greater than the complexity level of the first information. Furthermore, in some implementations, a list of the subset of interfaces is provided to the user device; and a selection of an interface of the subset is received from the first user device, where the selected interface is the new interface.

At 420, the new interface is implemented to facilitate for the customer to participate in the user session. In some implementations, the new interface is further provided by the first user device. In some implementations, the first interface is an audio interface provided by the first user device, where the new interface is a hybrid audio-visual interface, and where a visual portion of the hybrid audio-visual interface is provided by the second user device.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

The preceding figures and accompanying description described the disclosed methods and systems in the context of a financial institution providing financial information and/or services to the user. However, the disclosed methods and systems can be used in the context of any type of entity that may digitally provide information to users. An example of such an entity is a multimedia production entity, such as a news production entity. Specifically, a multimedia production entity can use the disclosed systems and methods to dynamically determine an interface for providing information to a user (e.g., a customer or subscriber).

Consider, as an example, a news production company. Using the disclosed methods and systems, the news production company may dynamically determine an interface for providing news to a user. For example, the news production company may be providing news information to a user via a first interface (e.g., an audio interface). While providing the news information to the user, the disclosed methods and systems can determine that the first interface is no longer suitable for providing the information to the user, perhaps based on the complexity of the news information to be provided to the user. In the example where the first interface is an audio interface, it can be determined that the first interface is not suitable for providing the user with a video news clip. In response, the disclosed methods and systems can use the disclosed methods and systems to proactively select and implement a new interface in order to provide the user with the desired information (e.g., the news video clip).

Consider, as another example, a sports content production company. Using the disclosed methods and systems, the sports content production may dynamically determine an interface for providing sports information to a user. For example, the sports content production company may be providing sports related information (e.g., statistical data) to a user via a first interface (e.g., a mobile application). While providing the sports related information to the user, the disclosed methods and systems can determine that the first interface is no longer suitable for providing the information to the user. In the example where the first interface is a mobile interface, it can be determined that the first interface is not suitable for providing the user with statistical information of a group of players. In response, the disclosed methods and systems can proactively select and implement a new interface in order to provide the user with the desired information. For example, the disclosed methods and systems can provide the user with the option of a new interface that includes a larger screen (e.g., a smart TV or projector).

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
a memory storing instructions;
at least one hardware processor interoperably coupled with the memory, wherein the instructions instruct the at least one hardware processor to:
establish, by a computing device operated by an entity, a user session with a first user device operated by a customer of the entity, wherein the first user device provides a first interface through which the customer participates in the user session, and wherein the computing device is configured to provide the first user device with information during the user session;
analyze first information to be provided to the customer to determine a complexity level of the first information;
determine that the complexity level of the first information is greater than a threshold complexity level associated with the first interface;
in response, determine to change the first interface to a new interface;
determine, based on contextual data, at least one available interface for the user;
select, from the at least one available interface, a subset of interfaces that are associated with a respective threshold complexity level greater than the complexity level of the first information;
provide, by the computer device, a list of the subset of interfaces to the first user device;
receive, from the first user device, a selection of an interface of the subset, wherein the selected interface is the new interface, wherein the new interface is provided by at least a second user device; and
implement the new interface to facilitate for the customer to participate in the user session.

2. The system of claim 1, wherein the instructions further instruct the at least one hardware processor to:
provide the first information to the user via the new interface.

3. The system of claim 1, wherein the new interface is further provided by the first user device.

4. The system of claim 3, wherein the first interface includes an audio interface provided by the first user device, wherein the new interface includes a hybrid audio-visual interface, and wherein a visual portion of the hybrid audio-visual interface is provided by the second user device.

5. The system of claim 1, wherein establishing, by the computing device, the user session with the first user device comprises:
receiving, from the first user device, a request to establish the user session with the first user device.

6. The system of claim 1, wherein establishing, by the computing device, the user session with the first user device comprises:
determining, by the computing device and based on at least on one of event triggers or contextual data, to establish the user session with the first user device.

7. A non-transitory, computer-readable medium storing computer-readable instructions executable by a computer and configured to instruct the computer to:
establish, by a computing device operated by an entity, a user session with a first user device operated by a customer of the entity, wherein the first user device provides a first interface through which the customer participates in the user session, and wherein the computing device is configured to provide the first user device with information during the user session;
analyze first information to be provided to the customer to determine a complexity level of the first information;
determine that the complexity level of the first information is greater than a threshold complexity level associated with the first interface;
in response, determine to change the first interface to a new interface;
determine, based on contextual data, at least one available interface for the user;
select, from the at least one available interface, a subset of interfaces that are associated with a respective threshold complexity level greater than the complexity level of the first information;
provide, by the computing device, a list of the subset of interfaces to the first user device;
receive, from the first user device, a selection of an interface of the subset, wherein the selected interface is the new interface, wherein the new interface is provided by at least a second user device; and
implement the new interface to facilitate for the customer to participate in the user session.

8. The computer-readable medium of claim 7, the instructions are further configured to instruct the computer to:
provide the first information to the user via the new interface.

9. The computer-readable medium of claim 7, wherein the new interface is further provided by the first user device.

10. The computer-readable medium of claim 9, wherein the first interface includes an audio interface provided by the first user device, wherein the new interface includes a hybrid audio-visual interface, and wherein a visual portion of the hybrid audio-visual interface is provided by the second user device.

11. The computer-readable medium of claim 7, wherein establishing, by the computing device, the user session with the first user device comprises:
receiving, from the first user device, a request to establish the user session with the first user device.

12. The computer-readable medium of claim 7, wherein establishing, by the computing device, the user session with the first user device comprises:
determining, by the computing device and based on at least on one of event triggers or contextual data, to establish the user session with the first user device.

13. A computerized method performed by one or more processors, the method comprising:
establishing, by a computing device operated by an entity, a user session with a first user device operated by a customer of the entity, wherein the first user device provides a first interface through which the customer participates in the user session, and wherein the computing device is configured to provide the first user device with information during the user session;
analyzing first information to be provided to the customer to determine a complexity level of the first information;
determining that the complexity level of the first information is greater than a threshold complexity level associated with the first interface;
in response, determining to change the first interface to a new interface;
determining, based on contextual data, at least one available interface for the user;
selecting, from the at least one available interface, a subset of interfaces that are associated with a respective threshold complexity level greater than the complexity level of the first information;
provide, by the computing device, a list of the subset of interfaces to the first user device;
receive, from the first user device, a selection of an interface of the subset, wherein the selected interface is the new interface, wherein the new interface is provided by at least a second user device; and
implementing the new interface to facilitate for the customer to participate in the user session.

14. The method of claim 13, further comprising:
providing the first information to the user via the new interface.

15. The method of claim 13, wherein the new interface is further provided by the first user device.

16. The method of claim 15, wherein the first interface includes an audio interface provided by the first user device, wherein the new interface includes a hybrid audio-visual interface, and wherein a visual portion of the hybrid audio-visual interface is provided by the second user device.

17. The method of claim 13, wherein establishing, by the computing device, the user session with the first user device comprises:
receiving, from the first user device, a request to establish the user session with the first user device.

* * * * *